United States Patent
Liao

(10) Patent No.: US 8,869,652 B2
(45) Date of Patent: Oct. 28, 2014

(54) POWER ASSISTING TRANSMISSION SYSTEM OF POWER ASSISTING BIKE

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 162 days.

(21) Appl. No.: 13/602,283

(22) Filed: Sep. 3, 2012

(65) Prior Publication Data

US 2014/0060246 A1 Mar. 6, 2014

(51) Int. Cl.
*F16H 37/06* (2006.01)
*B62M 6/50* (2010.01)
*B62M 6/40* (2010.01)

(52) U.S. Cl.
USPC .................. 74/665 R; 180/206.3; 180/220

(58) Field of Classification Search
USPC .................. 74/665 R; 180/206.1, 206.3, 220
See application file for complete search history.

(56) References Cited

U.S. PATENT DOCUMENTS

| 4,541,500 | A | * | 9/1985 | Gelhard | 180/205.2 |
| 5,758,736 | A | * | 6/1998 | Yamauchi | 180/220 |
| 5,941,333 | A | * | 8/1999 | Sun et al. | 180/206.4 |
| 6,015,159 | A | * | 1/2000 | Matsuo | 280/238 |
| 6,595,072 | B2 | | 7/2003 | Liao | |

\* cited by examiner

*Primary Examiner* — Ha D Ho
(74) *Attorney, Agent, or Firm* — Alan Kamrath; Kamrath IP Lawfirm, P.A.

(57) ABSTRACT

A power assisting transmission system of a power assisting bike drives a gear of the transmission system to produce a lateral force in forward and backward pedaling and to detect an axial displacement of a sliding gear in the transmission system to output a voltage signal to control motive power for driving a motor, to achieve forward and backward transmissions or a back pedaling brake effect.

6 Claims, 11 Drawing Sheets

POWER ASSISTING TRANSMISSION SYSTEM OF POWER ASSISTING BIKE

BACKGROUND OF THE INVENTION

1. Field of the Invention

The present invention relates to a power assisting transmission system of a power assisting bike and, more particularly, to the power assisting transmission system of a power assisting bike capable of achieving forward and backward transmissions or a back pedaling brake effect by forward and backward pedaling.

2. Description of the Related Art

As disclosed in U.S. Pat. No. 6,595,072 entitled "Sensor of the pedaling force of a power assisting bike", a transmission system of the power assisting bike comprises one or more pairs of screw gears. The screw gear is driven by a pedaling force to rotate in situ, and the other screw gear is engaged by the opposite screw gear installed on a shaft and driven to move horizontally in an axial direction. The screw gear has a resilience member installed at an end of the screw gear, and the resilience member and the shaft of the screw gear have an annular magnet moved synchronously with the screw gear. A fixed end disposed opposite to a displacing end of the magnet includes a Hall sensor installed thereon. Thus, the screw gear of the transmission system can produce a lateral force to detect an axial displacement of the screw gear to output a voltage signal to control a motor. The motor can output motive power to the power assisting bike to achieve the power assisting effect. However, when a crank of the power assisting bike is pedaled in a backward clockwise manually and a transmission shaft rotates clockwise (viewing from the direction from an end A1 to the other end A2 of a first transmission shaft A), a one-way ratchet B is installed between the first transmission shaft A and the first left-handed screw gear C capable of rotating the pair of gears counterclockwise. Thus, the first transmission shaft A rotates clockwise due to the one-way ratchet B, and the first screw gear C cannot be driven to rotate. Therefore, when a conventional power assisting bike is pedaling in a backward direction manually in an idle pedaling status, a chain gear G1 cannot be driven to rotate. Thus, the power assisting bike does not have any backward pedaling function, and it obviously requires improvements.

SUMMARY OF THE INVENTION

Therefore, it is a primary objective of the present invention to provide a power assisting transmission system of a power assisting bike capable of achieving forward and backward transmissions or a back pedaling brake effect by forward and backward pedaling.

To achieve the aforementioned objective, the present invention provides a power assisting transmission system of a power assisting bike, comprising: at least two pairs of mutually engaged gear sets, including first and second gear sets. The first and second gear sets includes a gear and a sliding gear respectively, and at least one of the first and second gear sets has a gear set comprised of two screw gears. The gear of the first and second gear sets is fixed onto a first transmission shaft, and both ends of the first transmission shaft is coupled to a pedal crank and driven by a pedaling force. The gear of the second gear set has a male end of a concave and convex connector disposed on an axial end. The sliding gear of the first and second gear sets is installed on a second transmission shaft and engaged and rotated by the corresponding gears of the first and second gear sets on the second transmission shaft to move axially and horizontally. A resilience member is installed at an axial end. An axial force pad, sheathed on a side of the gear of the second gear set, is disposed at a backward pedaling displacing end of the sliding gear of the first and second gear sets. An annular magnet, sheathed on a side of the sliding gear of the second gear set, is displaced synchronously by an external force. A Hall sensor is installed at a pedaling displacement end of the annular magnet for detecting a displacement variation of the annular magnet. A ratchet disc, sheathed on a gear edge of the second gear set, has a chain gear fixed to an edge, and a female end of a concave and convex connector is disposed on an internal side and matched with a male end of the concave and convex connector. The ratchet disc is driven to rotate selectively forward and backward by the gear of the second gear set. A driving motor, having a reduction mechanism installed at a front end of an output shaft of the motor, is comprised of a plurality of reduction gears. The last reduction gear is sheathed on an external side of the ratchet disc, so that a principle of producing a lateral force by the gear driven by the transmission system during the forward and backward pedaling detects an axial displacement of the sliding gear to output a voltage signal to control the driving motor to output motive power, to achieve forward and backward transmissions or a back pedaling brake effect.

DETAILED DESCRIPTION OF THE PREFERRED EMBODIMENTS

The objectives, technical characteristics, measures, effects and advantages of the present invention will become apparent with the detailed description of preferred embodiments accompanied with the illustration of related drawings as follows.

Figure 1:
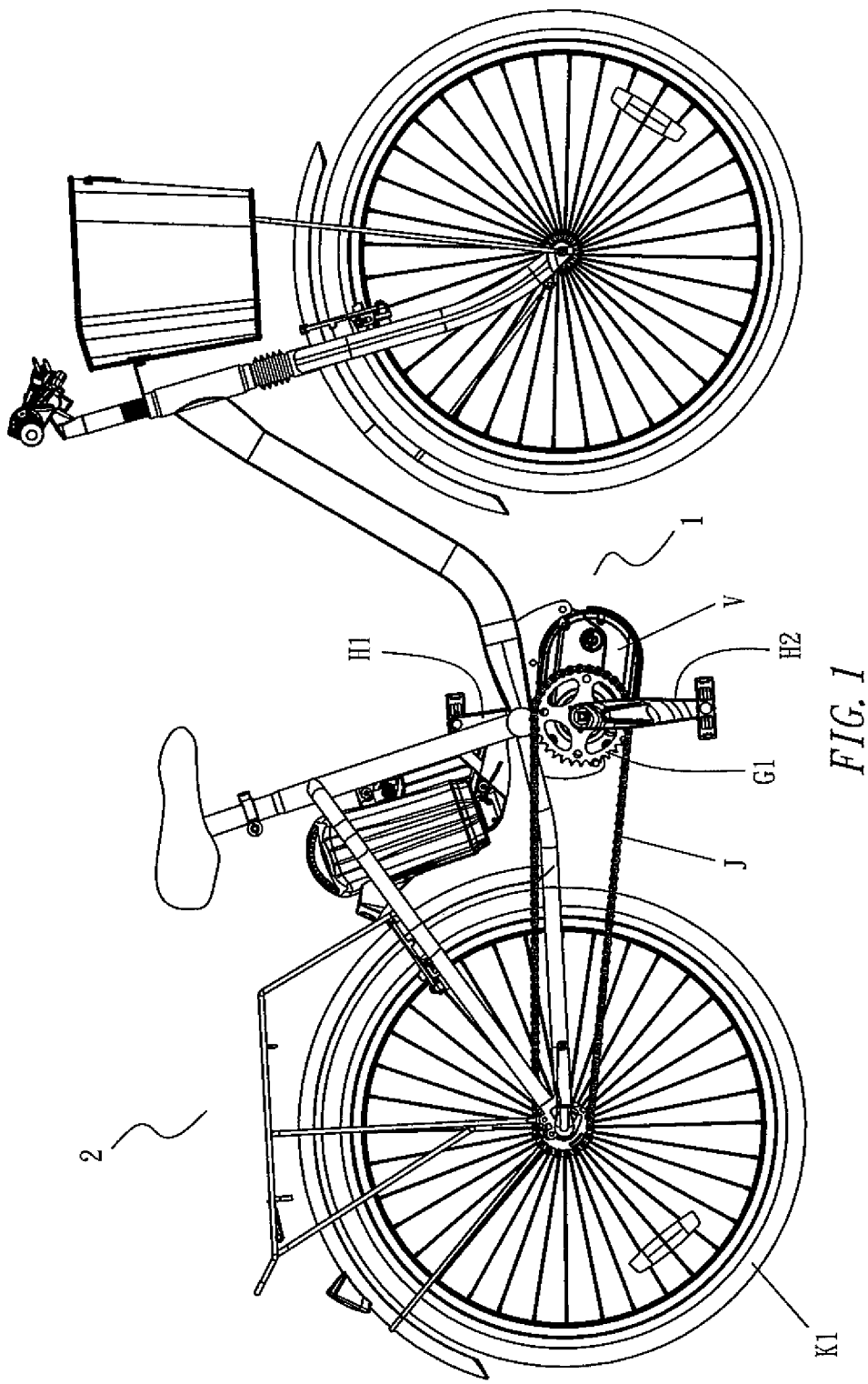
FIG. 1 is a side view of a power assisting transmission system installed on a power assisting bike in accordance with a preferred embodiment of the present invention.
Figure 2:
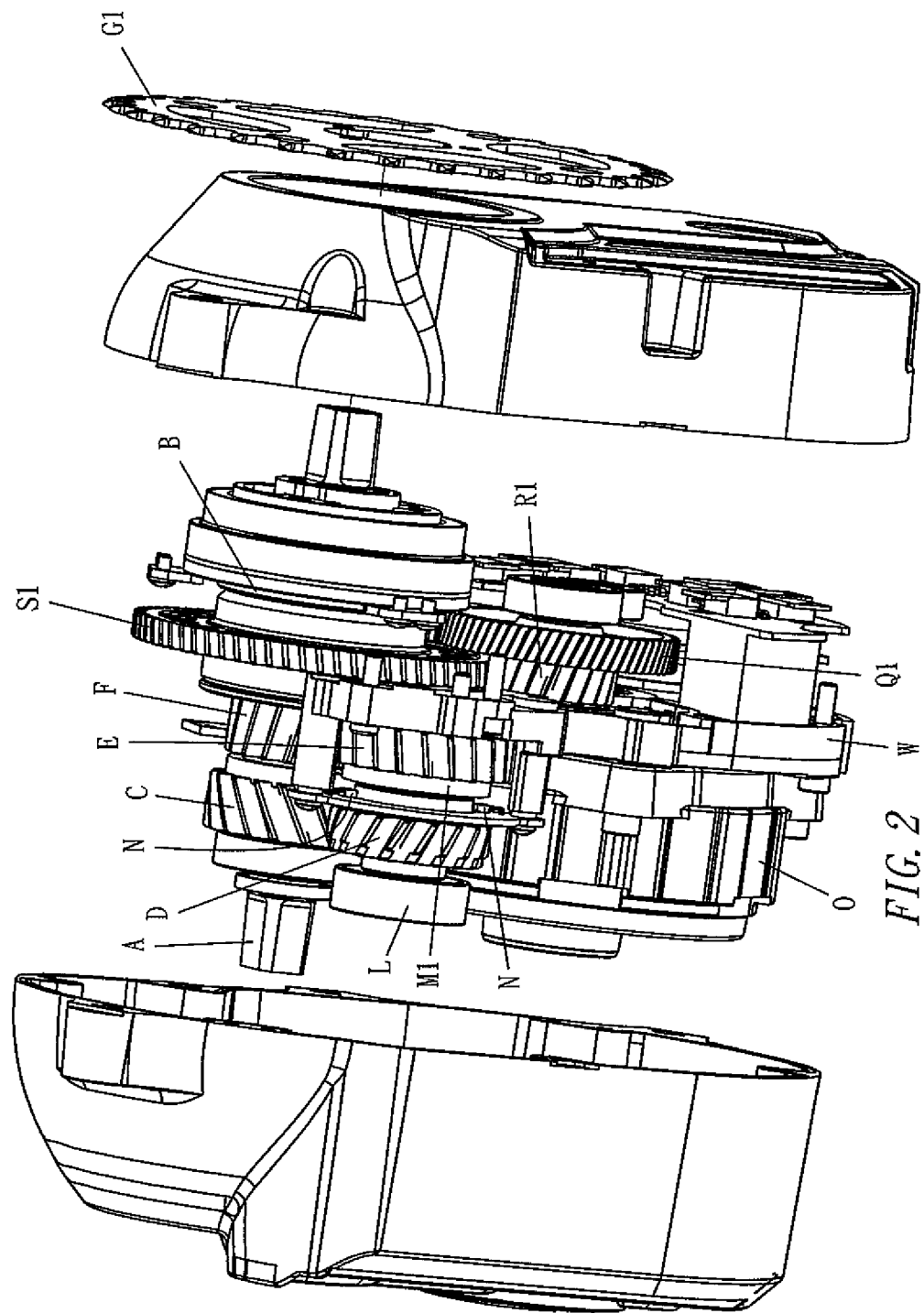
FIG. 2 is a partial exploded view of a preferred embodiment of the present invention.
Figure 3:
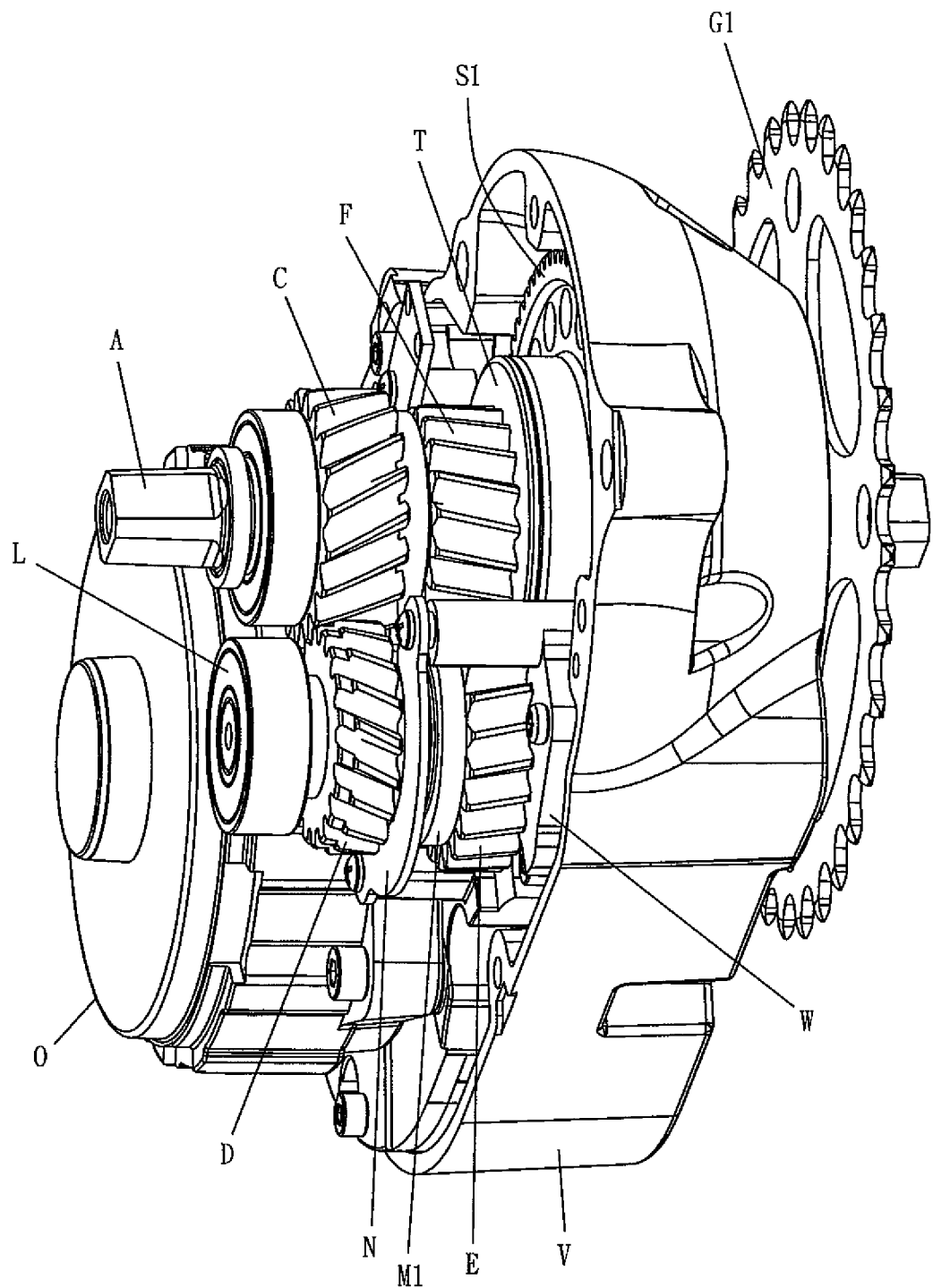
FIG. 3 is a first rear view of a preferred embodiment of the present invention.

With reference to FIGS. 1 to 3 for a transmission system of a preferred embodiment of the present invention, the transmission system 1 comprises a first transmission shaft A having a left end A1 and a right end A2 coupled to pedal cranks H1, H2 respectively. The pedal cranks H1, H2 are disposed on both left and right sides of the power assisting bike 2 respectively. The first transmission shaft A is driven when the pedal cranks H1, H2 are pedaled and driven by an external force.

Figure 5:
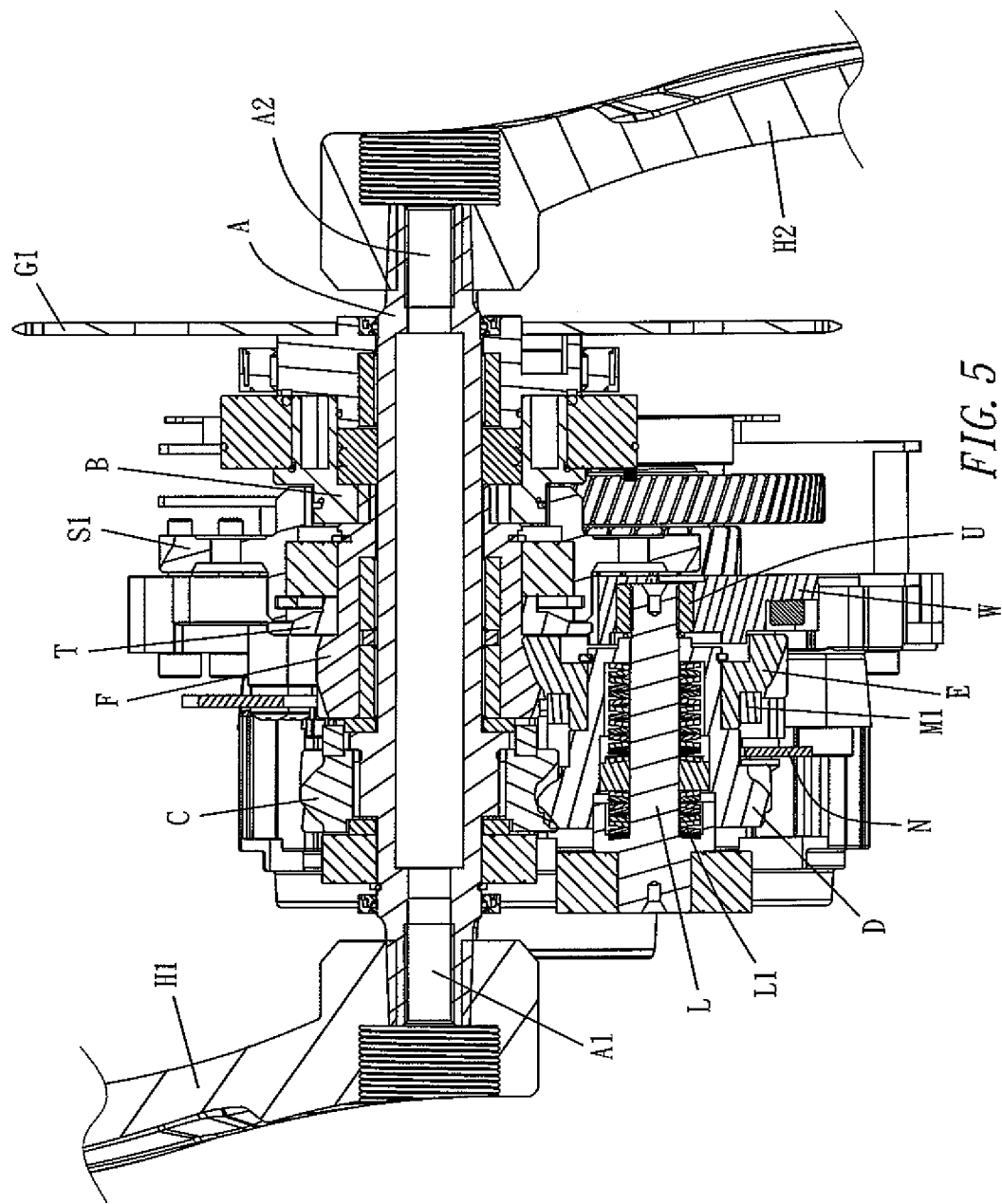
FIG. 5 is a first cross-sectional view of a first preferred embodiment of the present invention.

A left-handed screw gear C is installed at the left end A1 of the first transmission shaft A and operated synchronously with the first transmission shaft A. When the external force is provided for a forward pedaling, the first transmission shaft A is driven by the pedal cranks H1, H2 to rotate counterclockwise (viewing in the direction from the left end A1 to the right end A2 of the first transmission shaft A), and the screw gear C is also rotated counterclockwise accordingly (as shown in FIG. 5).

A second transmission shaft L, installed at a position adjacent to the first transmission shaft A, has a sliding gear set capable of displacing in an axial direction. The sliding gear set includes a right-handed screw sliding gear D and a left-handed screw sliding gear E, and the screw sliding gear D is engaged with the screw gear C of the first transmission shaft A. When the screw gear C is driven and rotated counterclockwise, the screw sliding gear D is driven to rotate clockwise (as shown in FIG. 2).

A left-handed screw sliding gear E is fixed to the screw sliding gear D, so that the two are rotated in the same direction and displaced in an axial direction simultaneously (as shown in FIG. 2).

A right-handed screw gear F, installed on the first transmission shaft A, is engaged with the screw sliding gear E, so that the screw gears C, F are rotated in the same direction (as shown in FIG. 2).

Figure 4:
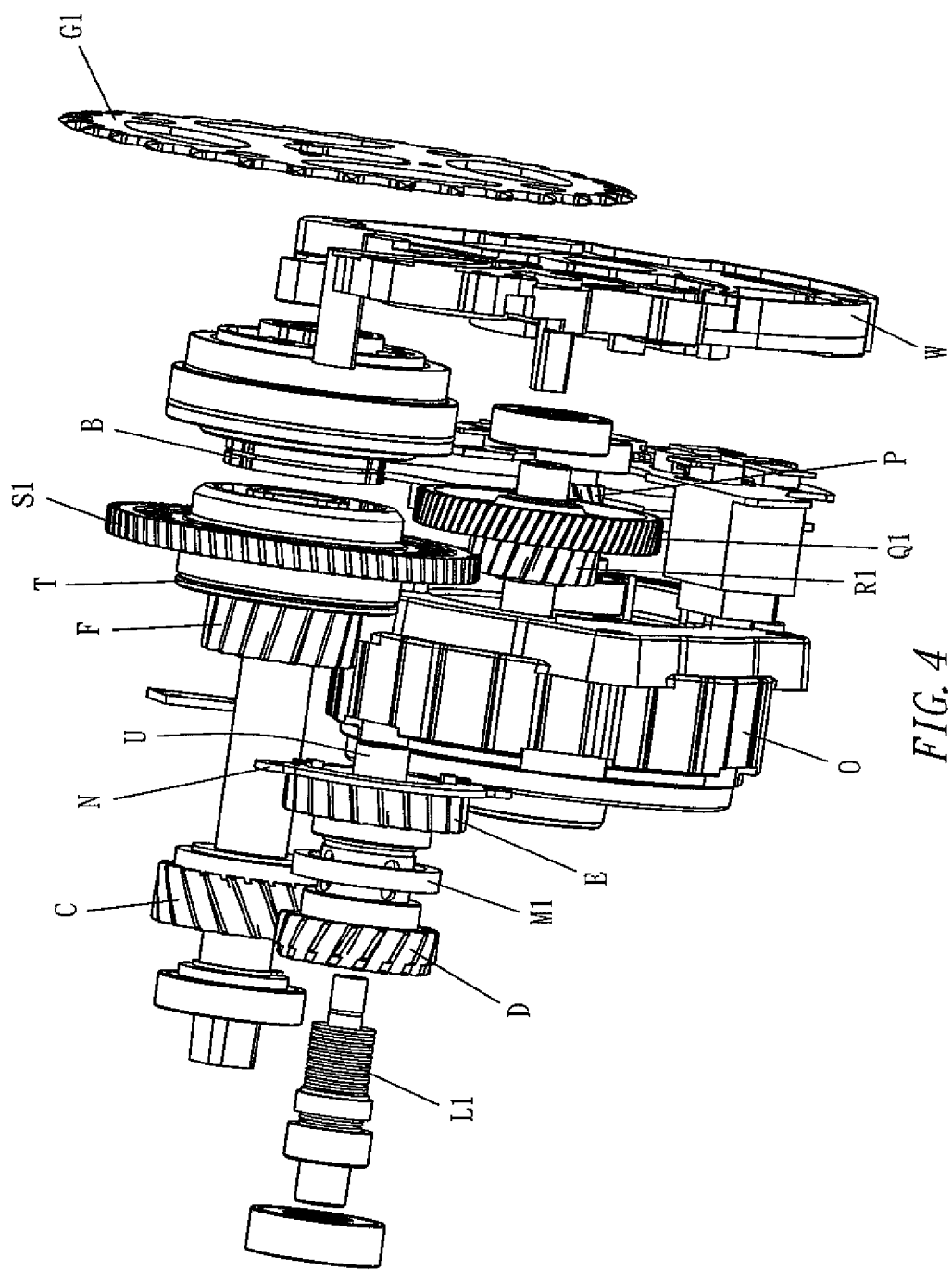
FIG. 4 is a second rear view of a preferred embodiment of the present invention.

An axial force pad T is sheathed onto the screw gear F and towards the right end A2 of the first transmission shaft A (as shown in FIGS. 4 and 5).

A ratchet disc B is sheathed on the right end A2 of the first transmission shaft A (as shown in FIGS. 4 and 5).

A concave and convex connector Q, being a connector where the screw gear F and the ratchet disc B are coupled, has a male end disposed at an axial edge of the screw and a female end disposed at an internal side of the ratchet disc B.

Figure 7:
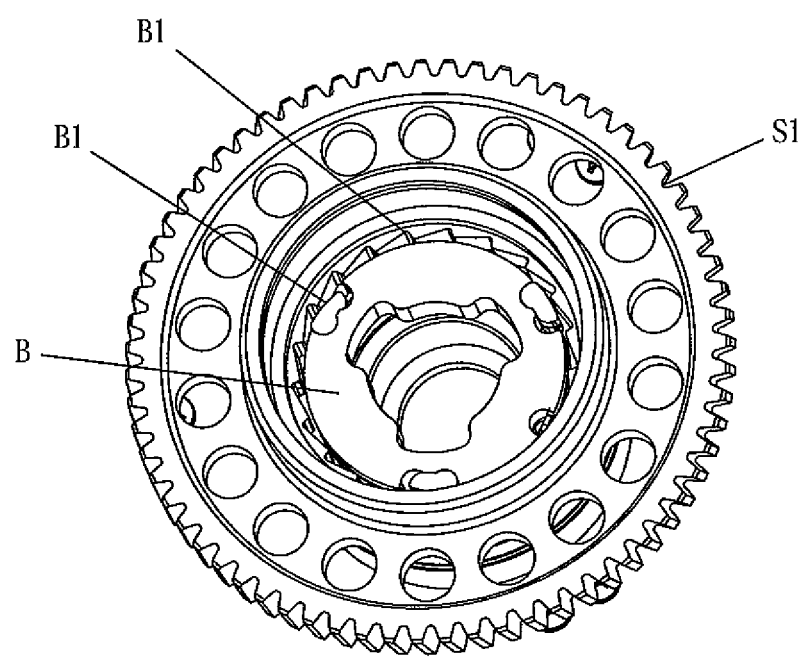
FIG. 7 is a schematic view of a screw gear and a ratchet disc assembled with a corresponding concave and convex connector in accordance with a preferred embodiment of the present invention.
Figure 8:
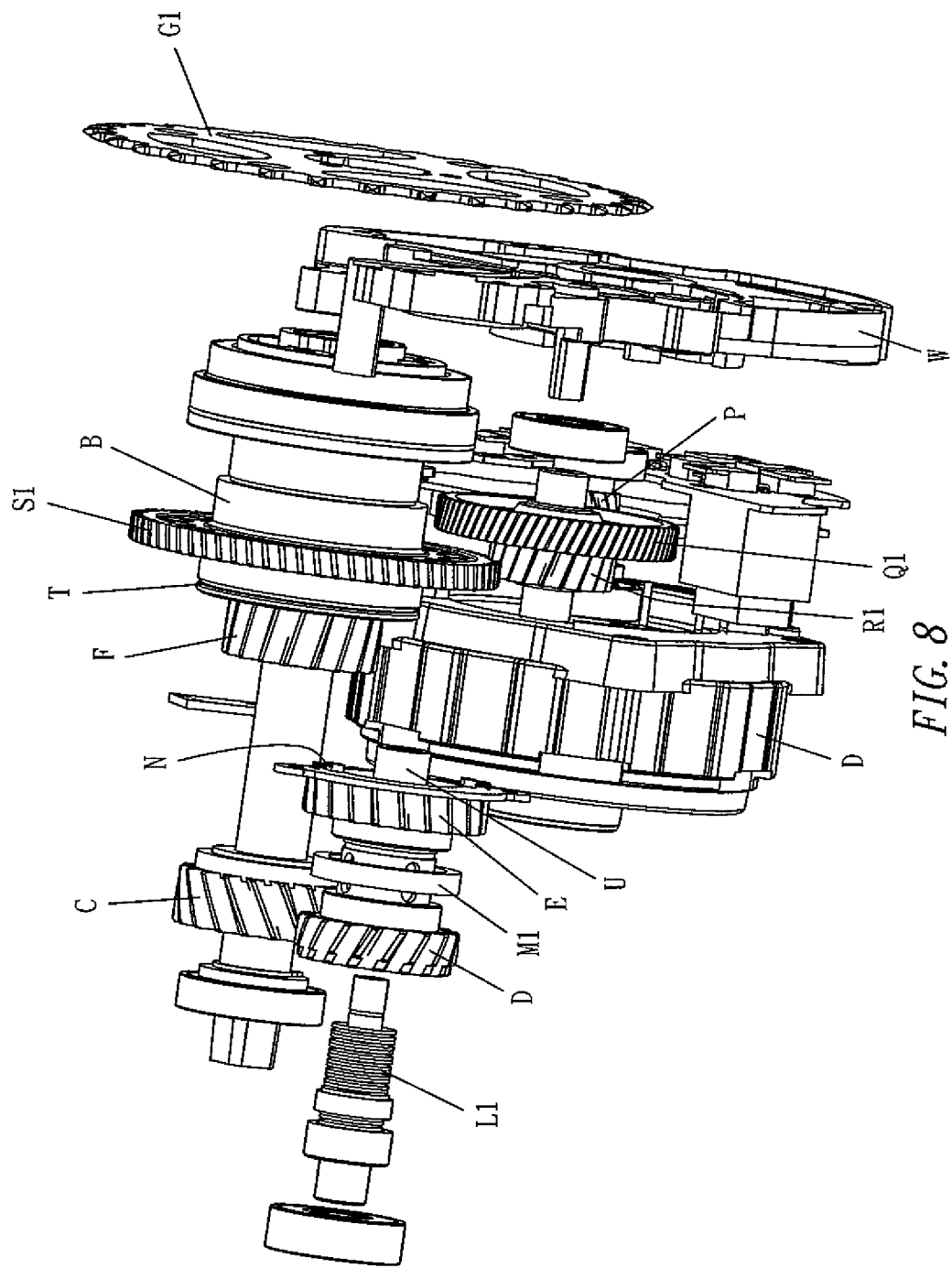
FIG. 8 is a schematic view of a ratchet disc with an external side assembled with the final reduction gear of a reduction mechanism in accordance with a preferred embodiment of the present invention.
Figure 9:
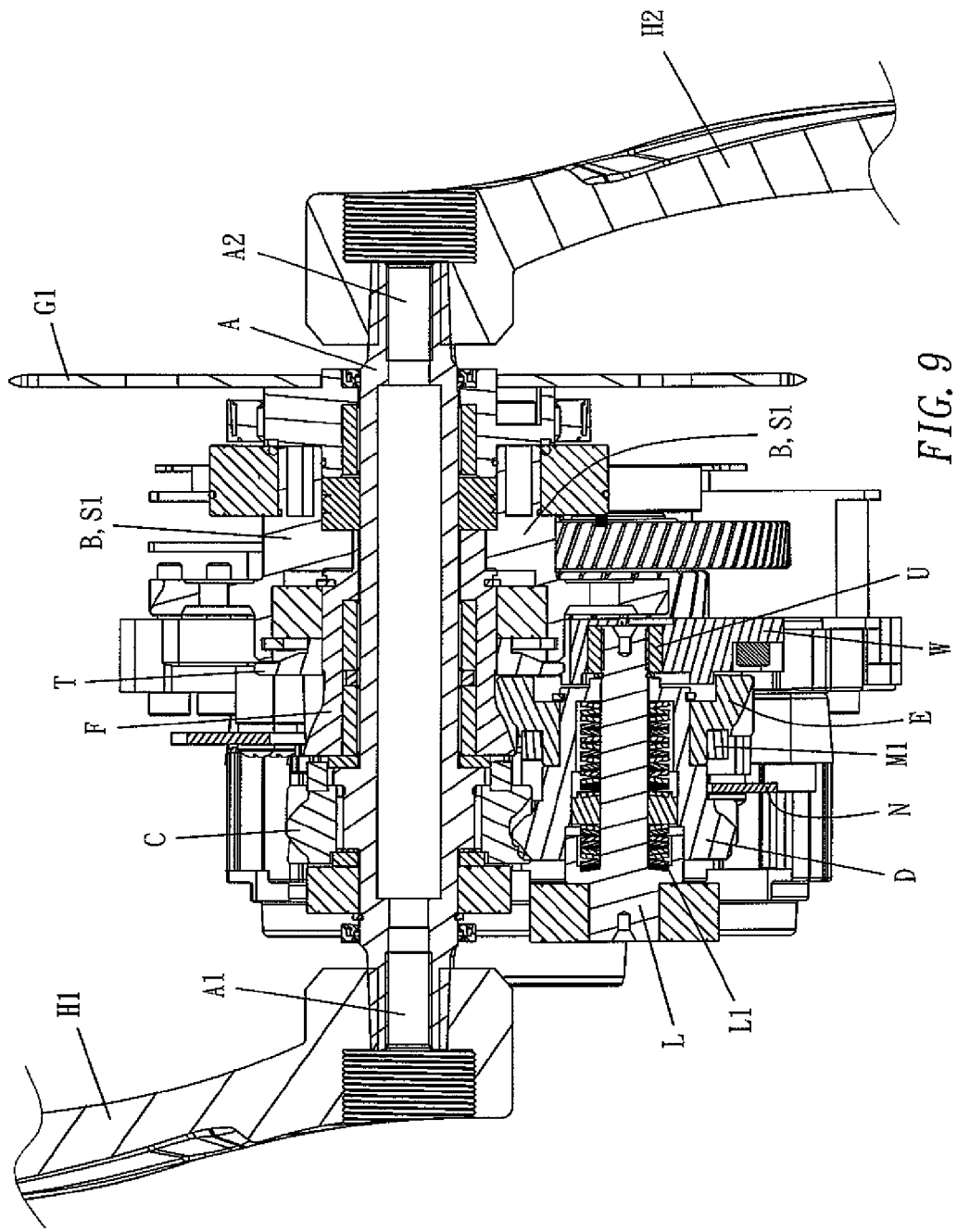
FIG. 9 is a second cross-sectional view of a preferred embodiment of the present invention.

A driving motor O, having a gear P installed at an output shaft of the motor O, drives a reduction mechanism comprised of a plurality of reduction gears Q1, R1, S1. The last reduction gear S1 is sheathed on an external side of the ratchet disc B, and the external side of the ratchet disc B and the last reduction gear S1 of the reduction mechanism are fixed and linked with one another (as shown in FIGS. 8 and 9). Alternately, a one-way ratchet B1 is installed between the external side of the ratchet disc B and the last reduction gear S1 of the reduction mechanism. In other words, the last reduction gear S1 can drive the one-way ratchet B1 to rotate the ratchet disc B forward in the counterclockwise direction, and the reduction mechanism will not be driven to rotate when the external force is provided for a forward pedaling in the counterclockwise direction (as shown in FIG. 7).

Figure 10:
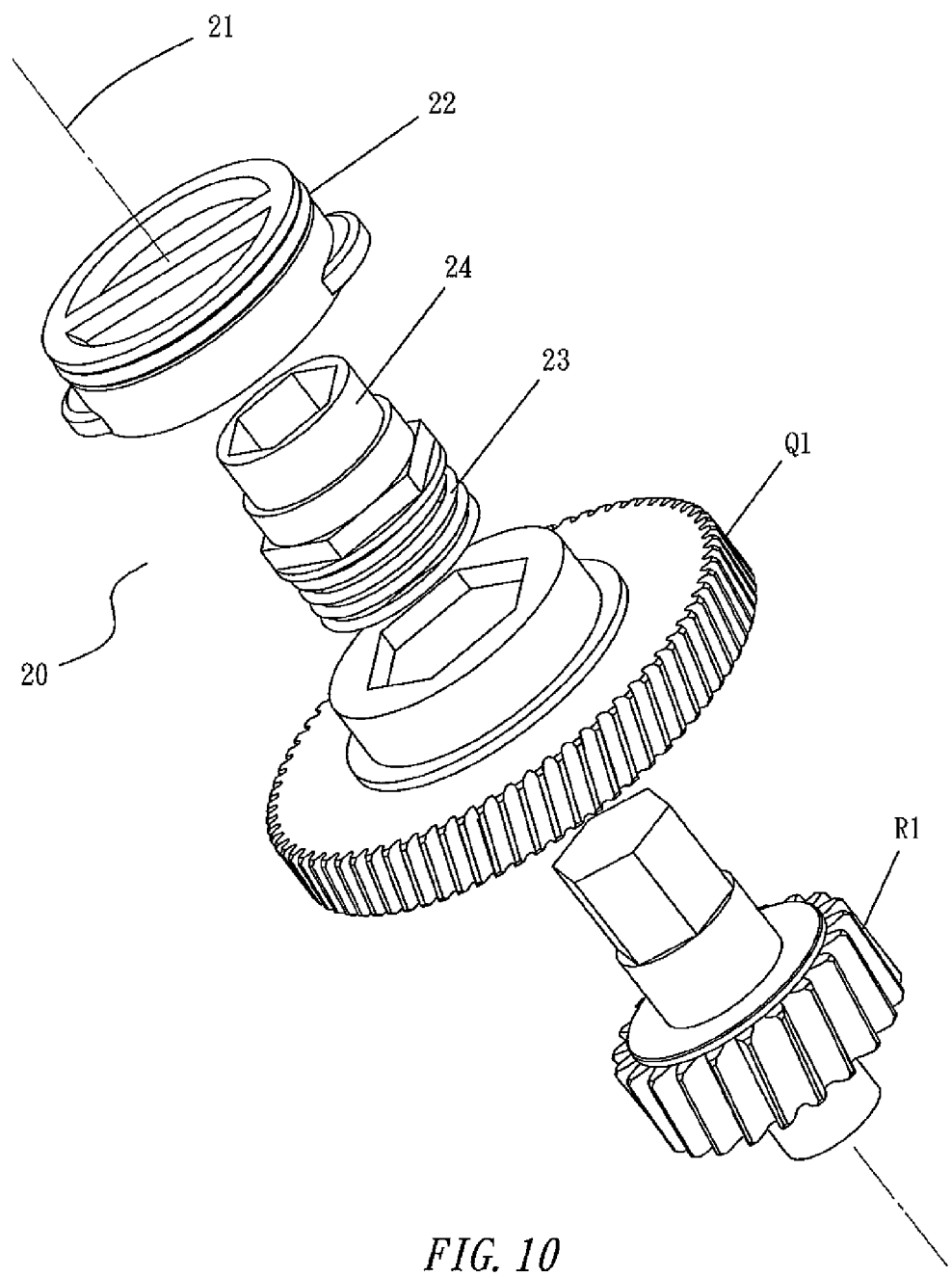
FIG. 10 is an exploded view of a clutch of a preferred embodiment of the present invention.
Figure 11:
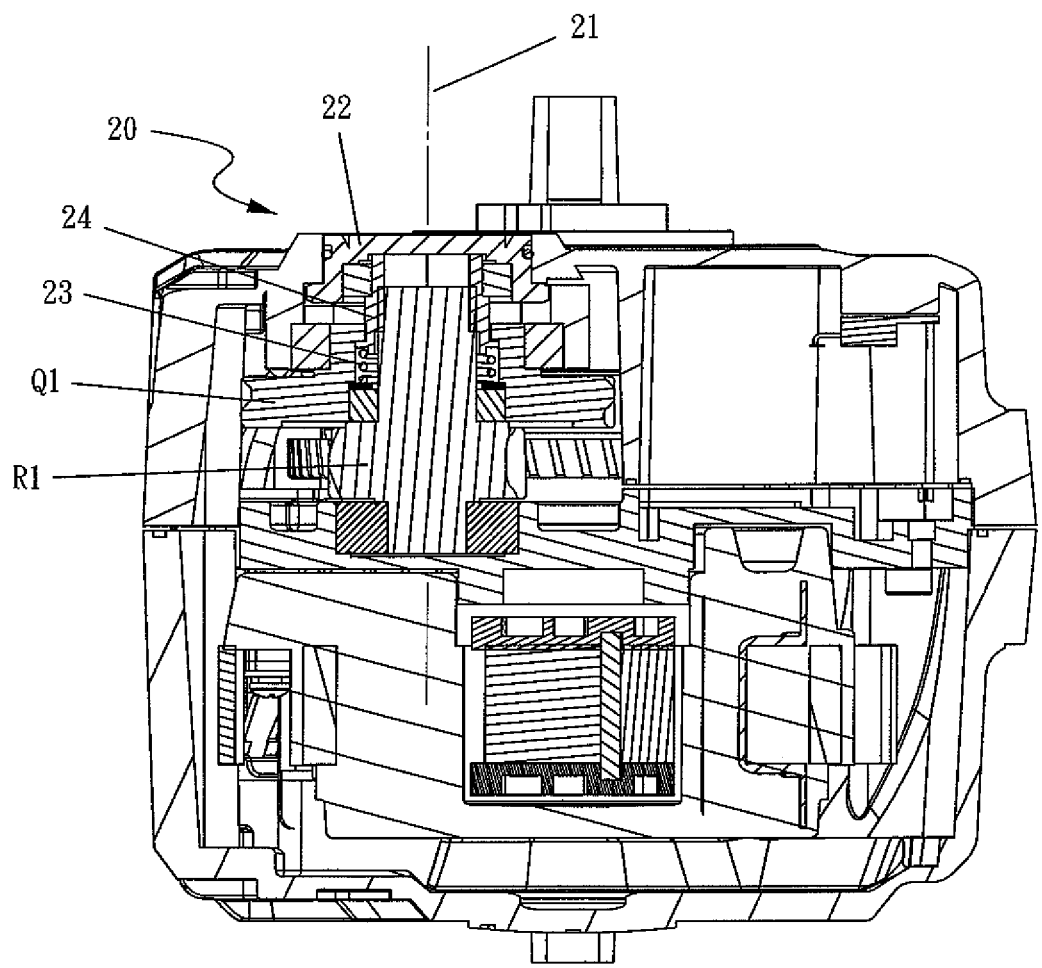
FIG. 11 is a second partial cross-sectional view of a first preferred embodiment of the present invention.

If the external side of the ratchet disc B and the last reduction gear S1 of the reduction mechanism are fixed, the reduction mechanism has a clutch 20 including a gear axis 21, reduction gears Q1, R1 sheathed thereon, a driving element 22, an elastic element 23 and a latching block 24 installed thereon. Thus, when the driving element 22 is pressed to release the clutch 20, the reduction gears Q1, R1 on the gear axis 21 can be switched to a non-mutual rotation relation, and when the driving element 22 is pressed to secure the clutch 20, the reduction gears Q1, R1 on the gear axis 21 resume their synchronous rotation relation (as shown in FIGS. 10 and 11).

Figure 6:
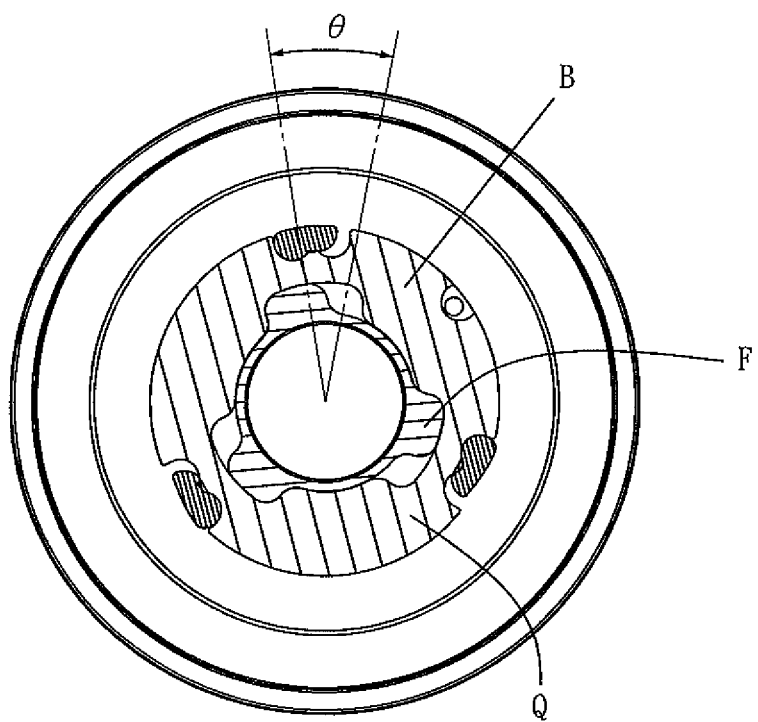
FIG. 6 is a first partial cross-sectional view of a first preferred embodiment of the present invention.

If the first transmission shaft A is rotated counterclockwise, the screw gear F will also be rotated counterclockwise, and the screw gear F can use the concave and convex connector Q matched with the ratchet disc B to drive the ratchet disc B to rotate counterclockwise (as shown in FIGS. 5 and 6).

A chain gear G1, fixed to the ratchet disc B and in a direction towards the right end A2, drives a chain J to rotate a rear wheel K1 counterclockwise (as shown in FIG. 1) to move forward.

In FIGS. 1 and 5, when the external force is provided for the backward pedaling, and when the pedal cranks H1, H2 drive the first transmission shaft A to rotate clockwise, the screw gear C also rotates clockwise to sequentially drive the screw sliding gear D of the second transmission shaft L to rotate counterclockwise, the screw sliding gear E to rotate counterclockwise, and the screw gear F of the first transmission shaft A to rotate clockwise, Then, the ratchet disc B drives the chain gear G1 and the chain J to rotate clockwise, to drive a brake hub of a rear wheel K1 to stop the rear wheel K1 or drives the wheels to rotate clockwise for a forward movement in the backward direction.

In FIGS. 4 and 5, during the aforementioned forward pedaling transmission, the physical characteristics of producing a lateral force by the gears C, D, E, F during their rotation can drive the screw gear C to rotate the screw sliding gear D, such that the screw sliding gear D produces a lateral force in the direction towards the left end A1 of the first transmission shaft A. Since there is no locking device between the screw sliding gears D, E and the second transmission shaft L, the screw sliding gears D, E can move horizontally in the axial direction on the second transmission shaft L. Now, the displacement of the screw sliding gears D, E can be used for detecting the pedaling torque of the pedal cranks H1, H2.

On the other hand, during the back pedaling, the screw gear C drives the screw sliding gear D to rotate, so that the screw sliding gear D produces a lateral force in the direction towards the right end A2 of the first transmission shaft A. Now, the screw sliding gears D, E displace horizontally towards the right end A2. Since the axial force pad T is installed at the right end A2 of the first transmission shaft A, and since a gap is reserved between the axial force pad T and the screw sliding gear E, the gap can be used for controlling the displacement of the screw sliding gears D, E moving towards the right end A2. When the screw sliding gears D, E push the right end A2 to contact with the axial force pad T, such action force will be transmitted back to the first transmission shaft A. The screw sliding gear E also has an action force of the screw gear F in a direction towards the left end A1, so that the action force of the screw sliding gear E onto the screw gear F is offset by the action force of the axial force pad T of the screw sliding gear E to protect the bearings U installed at both ends of the second transmission shaft L respectively and eliminate the axial pushing force of the second transmission shaft L.

With the aforementioned components, a resilience member L1 is sheathed and installed on the second transmission shaft L. The resilience member L1 moves and compresses the left end A1 to deform by the lateral force produced by the rotation of the screw sliding gears D, E during the forward pedaling process, so that the displacement of the screw sliding gears D, E can output a torque at the first transmission shaft A linearly to provide a force to return the screw sliding gears D, E to their original positions.

In the present invention, the annular magnet M1 used for detecting the displacement of the screw sliding gears D, E is installed at an edge of the screw sliding gear E, and a Hall sensor N is installed at an edge opposite to the magnet M1 and fixed to a middle plate W coupled to a gearbox casing V. The Hall sensor N can be used for sensing the variation of distance of the magnet M1 to accurately measure a voltage signal that represents the intensity of the force of the pedal cranks H1, H2, and the voltage signal can control the output of motive power of the motor O.

Therefore, the motor O is driven by the gear P at the front of the axis to drive the reduction mechanism comprised of the reduction gears Q1, R1, S1 and to further drive the chain gear G1 to achieve the effect of outputting a forward assisting motive power.

When the pedal cranks H1, H2 are not pedaled, the voltage signal has an initial voltage value. When the pedal cranks H1, H2 start pedaling, the voltage signal increases, so that the motor O outputs motive power according to the voltage signal and transmits the motive power to the reduction gear S1. If the external side of the ratchet disc B and the last reduction gear S1 of the reduction mechanism are fixed to each other, the reduction gear S1 can be a one-way ratchet B1 for driving the ratchet disc B to rotate forward in a counterclockwise direction, or can be a clutch 20 being in a locking status, so that the ratchet disc B and the chain gear G1 can be rotated counterclockwise.

When the pedaling is switched to the backward pedaling, the screw sliding gears D, E displace towards the right end A2, so that the voltage sensing value returns to the initial value or to a value even below the initial value quickly. The motor O stops outputting the motive power to the reduction gear S1 immediately, and a fixed slip θ is reserved between the screw gear F and the concave and convex connector Q matched with the ratchet disc B (as shown in FIG. 6). If the concave and convex connector Q is rotated to the slip θ while pedaling is changed from forward pedaling to backward pedaling, a friction will be produced during the rotation. Before the concave and convex connector Q is rotated to a dead spot, a force is transmitted to the screw sliding gear E and the screw sliding gear D to produce a pushing force in a direction towards the right end A2, and the voltage sensing value can return to the initial value quickly or can even decrease to a value below the initial value to stop the rotation of the motor O and the reduction gears Q1, R1, S1. After the screw gear F continues rotating clockwise to a position without any slip, the concave and convex connector Q starts driving the ratchet disc B and the chain gear G1 to rotate clockwise, to drive a brake hub of a rear wheel to achieve the brake function and stop the rear wheel K1.

In addition, when the external side of the ratchet disc B and the last reduction gear S1 of the reduction mechanism are fixed and the clutch 20 is situated at the locking status, the rear wheel K1 and the rear chain disc are rotated in the same direction simultaneously, and the voltage sensing value is decreased below the initial value in a backward pedaling. The motor O and the reduction gears Q1, R1, S1 are rotated backward, to drive the ratchet disc B, the chain gear G1 and the rear wheel K1 to rotate clockwise and move in a backward direction.

In addition, since the reduction mechanism has a clutch 20, the clutch 20 is set to a released status when there is no electric assisting power to disconnect the transmission relation, the reduction mechanism provided that the external side of the ratchet disc B is fixed to the last reduction gear S1 of the reduction mechanism, and the motor O will not be rotated during forward or backward pedaling to reduce the pedaling force.

In summation of the description above, the present invention comprises two pairs of mutually engaged gear sets including first and second gear sets. Each gear set includes a gear and a sliding gear. The first and second gear sets include a gear set comprised of two screw gears, such as a left-handed screw gear C, a right-handed screw sliding gear D, a left-handed screw sliding gear E and a right-handed screw gear F.

The screw sliding gears D, E of the present invention are right-handed and left-handed respectively for increasing the lateral force of the displacement. It only requires one of the sets of screw gears C, D or screw gears E, F to be screw gears, and there is no limitation on the other set of screw gears. The other set of screw gears can be straight gears or screw gears to achieve the effect of producing a lateral force by the screw gears to detect a pedaling force of the power assisting bike 2.

In summation of the description above, the present invention has one or more of the following advantages and effects:

1. During the forward pedaling, the screw gear C rotates counterclockwise to drive the screw sliding gears D, E to displace axially towards the left end A1. The Hall sensor N senses a voltage higher than the initial value and is capable of transmitting assisting motive power outputted from the motor O to the chain gear G1, to drive the chain J to rotate. During the backward pedaling, the screw gear C rotates clockwise to drive the screw sliding gears D, E to displace axially towards the right end A2, so that the sensed value returns to the initial value or a value even smaller than the initial value quickly to stop the motor O from outputting the motive power. The backward pedaling drives the chain J to rotate clockwise to achieve the startup and braking functions of the brake hub of the rear wheel K1, to achieve the back pedaling brake function.

2. When the external side of the ratchet disc B is fixed to the last reduction gear S1 of the reduction mechanism, and when the rear wheel K1 rotates in the same direction synchronously with the rear chain disc, the voltage sensing value is decreased below the initial value during the backward pedaling. The motor O and the reduction gears Q1, R1, S1 are rotated in the backward direction, to drive the ratchet disc B, the chain gear G1 and the rear wheel to rotate clockwise to move forward in a reverse direction.

3. There is a gap between the axial force pad T and the screw sliding gear E for controlling the screw sliding gears D, E to displace towards the right end A2. After the screw sliding gears D, E displace towards the right end A2 to contact with the axial force pad T, action forces will be transmitted back to the first transmission shaft A. During the backward pedaling, the action forces transmitted from the screw sliding gear E to the first transmission shaft A are offset by the action force of the screw sliding gear E provided to the screw gear F to protect the bearings U installed at both ends of the second transmission shaft L respectively, and eliminating the axial pushing force of the second transmission shaft L.

4. The screw gear F has a fixed slip θ reserved between the male end and the female end of the concave and convex connector Q matched with the ratchet disc B. When the driving force is switched from the forward direction to the backward direction, and before friction produced between the male end and the female end of the concave and convex connector Q rotates the concave and convex connector Q to a dead spot, a pushing force in the backward direction is produced by the screw sliding gear E and the screw sliding gear D to return the sensed value back to the initial value or to a value even less than the initial value, to drive the motor O to stop rotating the reduction gears Q1, R1, S1. Then, after the screw gear F continues rotating clockwise to an angle without any slip, the concave and convex connector Q starts driving the ratchet disc B and the chain gear G1 to rotate clockwise and prevent the motor O from continuing driving the reduction gears Q1, R1, S1 to rotate when a rider wants to switch to the backward pedaling. This arrangement can prevent a bumpy feeling of the rider.

In summation of the description above, the present invention achieves the expected objectives and effects. While the invention has been described by means of specific embodiments, numerous modifications and variations could be made thereto by those skilled in the art without departing from the scope and spirit of the invention set forth in the claims.

What is claimed is:

1. A power assisting transmission system of a power assisting bike, comprising:

first and second, mutually engaged, gear sets, with the first and second gear sets including a gear and a sliding gear respectively, with at least one of the first and second gear sets comprised of two screw gears; with the gear of the first and second gear sets fixed onto a first transmission shaft, with both ends of the first transmission shaft coupled to a pedal crank and driven by a pedaling force, with the gear of the second gear set having a male end of a concave and convex connector disposed on an axial end, with the sliding gear of the first and second gear sets installed on a second transmission shaft and engaged and rotated by the corresponding gears of the first and second gear sets on the second transmission shaft to move axially and horizontally, with the sliding gear having a resilience member installed at an axial end;

an axial force pad sheathed on a side of the gear of the second gear set and disposed at a backward pedaling displacing end of the sliding gear of the first and second gear sets;

an annular magnet sheathed on a side of the sliding gear of the second gear set and displaced synchronously by an external force;

a Hall sensor installed at a pedaling displacement end of the annular magnet for detecting a displacement variation of the annular magnet;

a ratchet disc, sheathed on a gear edge of the second gear set, and having a chain gear fixed to an edge, with a female end of a concave and convex connector disposed on an internal side and matched with the male end of the concave and convex connector, wherein the ratchet disc is driven to rotate selectively forward and backward by the gear of the second gear set; and a driving motor having a reduction mechanism installed at a front end of an output shaft of the motor and comprised of a plurality of reduction gears, wherein a last reduction gear of the plurality of reduction gears is sheathed on an external side of the ratchet disc.

2. The power assisting transmission system of a power assisting bike according to claim 1, wherein a gap is formed between the axial force pad and the sliding gear of the second gear set.

3. The power assisting transmission system of a power assisting bike according to claim 1, wherein a slip angle is formed between the male end of the concave and convex connector and the female end of the concave and convex connector of the ratchet disc.

4. The power assisting transmission system of a power assisting bike according to claim 1, wherein the external side of the ratchet disc and the last reduction gear of the reduction mechanism are fixed and linked with one another.

5. The power assisting transmission system of a power assisting bike according to claim 1, further comprising a one-way ratchet installed between the external side of the ratchet disc and the last reduction gear of the reduction mechanism.

6. The power assisting transmission system of a power assisting bike according to claim 1, wherein the reduction mechanism includes a clutch structure comprising a gear axis with the plurality of reduction gears sheathed thereon, with the gear axis having a driving element, an elastic element and a latching block.

* * * * *